(12) United States Patent
Elbe et al.

(10) Patent No.: US 8,369,520 B2
(45) Date of Patent: *Feb. 5, 2013

(54) CRYPTOGRAPHIC DEVICE EMPLOYING PARALLEL PROCESSING

(75) Inventors: Astrid Elbe, München (DE); Norbert Janssen, München (DE); Holger Sedlak, Sauerlach (DE)

(73) Assignee: Infineon Technologies AG, Neubiberg (DE)

( * ) Notice: Subject to any disclaimer, the term of this patent is extended or adjusted under 35 U.S.C. 154(b) by 1139 days.

This patent is subject to a terminal disclaimer.

(21) Appl. No.: 12/034,252

(22) Filed: Feb. 20, 2008

(65) Prior Publication Data

US 2008/0140739 A1    Jun. 12, 2008

Related U.S. Application Data

(60) Division of application No. 10/461,905, filed on Jun. 13, 2003, now Pat. No. 7,430,293, which is a continuation of application No. PCT/EP01/14349, filed on Dec. 6, 2001.

(30) Foreign Application Priority Data

Dec. 13, 2000  (DE) .................................. 100 61 997

(51) Int. Cl.
*H04L 9/00*  (2006.01)
(52) U.S. Cl. .......................................... 380/44; 380/277
(58) Field of Classification Search .......................... None
See application file for complete search history.

(56) References Cited

U.S. PATENT DOCUMENTS

| 4,870,681 A | 9/1989 | Sedlak |
| 6,219,420 B1 * | 4/2001 | Hardy et al. ....................... 380/2 |
| 6,408,075 B1 | 6/2002 | Ohki et al. |
| 6,735,611 B2 | 5/2004 | Vanstone |
| 6,839,849 B1 * | 1/2005 | Ugon et al. ..................... 726/20 |

FOREIGN PATENT DOCUMENTS

| DE | 36 31 992 A1 | 11/1987 |
| DE | 195 39 700 C1 | 11/1996 |
| FR | 2 787 900 A1 | 6/2000 |
| FR | 2 789 535 A1 | 8/2000 |
| GB | 2 130 405 A | 5/1984 |

OTHER PUBLICATIONS

Advanced Micro Device. The AM2900 Family Data Book with Related Support Circuits, Advance micro Devices, Inc., Sunnyvale, CA, USA, 1979, http://www.bitsavers.org/pdf/amd/_dataBooks/1979_AMD_2900family.pdf.

Linley Gwennap: "UltraSparc Adds Multimedia Instructions", Dec. 5, 1994.

(Continued)

*Primary Examiner* — Pramila Parthasarathy
(74) *Attorney, Agent, or Firm* — Dickstein Shapiro LLP

(57) ABSTRACT

A cryptography processor includes a central processing unit and a co-processor, the co-processor comprising a plurality of calculating subunits as well as a single control unit which is coupled to each of the plurality of calculating subunits. A cryptographic operation is distributed among the individual calculating subunits in the form of sub-operations by the control unit. The central processing unit, the plurality of calculating subunits and the control unit are integrated on a single chip, the chip comprising a common supply current access for supplying the plurality of calculating subunits and the control unit with current. Due to the arrangement of the calculating subunit in parallel, on the hand, the throughput of the cryptography processor is increased. On the other hand, however, the current profile that may be detected at the supply current access is randomized to such an extent that an attacker can no longer infer numbers processed in the individual calculating subunits.

16 Claims, 5 Drawing Sheets

OTHER PUBLICATIONS

Walter, C.D.; "Improved Linear Systolic Array for Fast Modular Exponentiation"; IEE Proc.-Comput. Digit. Tech., vol. 147, No. 5, Sep. 2000, pp. 323-328.

Großschaedl, J.; "High-Speed RSA Hardward Based on Barret's Modular Reduction Method"; Eds.: C.K. Koc and C. Paar, CHES 2000, LNCS 1965, pp. 191-203, Springer-Verlag, 2000.

Kato, T. et al.; A Design for Modular Exponentiation Coprocessor in Mobile Telecommunication Terminals, Eds.: C.K.Koc and C. Paar, CHES 2000, LNCS 1965, pp. 215-228, Springer-Verlag, 2000, 13 pages.

Erwin Hess et al.; "Implementations of cryptographic Algorithms and Countermeasures"; Eurosmart Security Conference Proceedings, Jun. 13-15, 2000, pp. 54-64.

Erwin Hess et al.; "Design of Long Integer Arithmetic Units for Public-Key Algorithms"; Eurosmart Security Conference Proceedings, Jun. 13-15, 2000, pp. 324-334.

David Naccache et al.; "Arithmetic Co-processors for Public-key Cryptography: The State of the Art"; Proc. Of Cardis '96, Amsterdam, The Netherlands, Sep. 16-18, 1996, pp. 39-58.

* cited by examiner $$x^d \bmod N$$

$$d = d_{n-1} * 2^{n-1} + d_{n-2} * 2^{n-2} + \ldots + d_1 * 2^1 + d_0 * 2^0$$

$$\overset{CP_1}{\phantom{x}} \quad \vdash\dashv \quad \overset{CP_k}{\phantom{x}}$$
$$x^d \bmod N = x^{d\_n-1 * 2\wedge n-1} \bmod N * \ldots * x^{d\_0 * 2\wedge 0} \bmod N$$

FIG 5

$$(a \cdot b) \bmod c = [\sum_i a_i b_i] \bmod c =$$

$$\overset{CP_1}{a_0 b_0 \bmod c} + \overset{CP_2}{a_1 b_1 \bmod c} + \ldots \overset{CP_n}{a_{n-1} b_{n-1} \bmod c}$$

FIG 6

CRYPTOGRAPHIC DEVICE EMPLOYING PARALLEL PROCESSING

CROSS-REFERENCE TO RELATED APPLICATION

This application is a division of copending application Ser. No. 10/461,905, filed Jun. 13, 2003, which was a continuation of international application PCT/EP2001/14349, filed Dec. 6, 2001, which designated the United States; this application further claims the priority, under 35 U.S.C. §119, of German patent application DE 100 61 997, filed Dec. 13, 2000; the foregoing applications are herewith incorporated by reference in their entirety.

BACKGROUND OF THE INVENTION

Field of the Invention

The present invention relates to cryptography techniques and, in particular, to the architecture of cryptography processors used for cryptographic applications.

With an increasingly widespread use of cashless money transfer, electronic data transmission via public networks, exchange of credit card numbers via public networks and, generally speaking, the use of so-called smart cards for the purposes of payment, identification or access, there is an increasing need for cryptography techniques. Cryptography techniques include, on the one hand, cryptography algorithms and, on the other hand, suitable processor solutions which execute the calculations specified by the cryptography algorithms. In the past, when cryptography algorithms used to be executed by means of general-purpose calculators, the cost, the calculation time requirement and security with regard to diverse external attacks did not play as decisive a roll as nowadays, where cryptographic algorithms are increasingly executed on chip cards or special security ICs, for which there are specific requirements. Thus, on the one hand, such smart cards must be available in a cost-efficient manner, as they are mass products, on the other hand, however, they must exhibit high security towards external attacks, as they are completely in the control of the potential attacker.

In addition, cryptographic processors must provide considerable calculating capacity, particularly since the security of many cryptographic algorithms, such as the well-known RSA algorithm, fundamentally depends on the length of the keys used. In other words, this means that with an increasing length of the numbers to be processed, security increases as well, since an attack based on trying out all possibilities is rendered impossible for reasons concerning calculation time.

Expressed in figures, this means that cryptography processors must handle integers which may have a length of, say, 1024 bits, 2048 bits or perhaps even more. As a comparison, processors in a typical PC process 32-bit or 64-bit integers.

High calculating expenditure, however, also signifies a large amount of calculating time, so that the essential requirement on cryptography processors is, at the same time, to achieve a high calculating throughput, so that, for example, an identification, access to a building, a payment transaction or a credit card transfer does not take many minutes, which would be extremely detrimental to market acceptance.

In summary, therefore, it can be stated that cryptography processors must be secure, fast and, therefore, extremely high-performing.

One possibility of increasing the throughput through a processor is to provide a central processing unit with one or several co-processors which work in parallel, such as is the case, for instance, in modern PCs or in modern graphics cards. Such a scenario is depicted in FIG. 7. FIG. 7 depicts a computer circuit board 800 on which a CPU 802, a random-access memory (RAM) 804, a first co-processor 806, a second co-processor 808 as well as a third co-processor 810 are located. CPU 802 is connected with the three co-processors 806, 808 and 810 via a bus 812. In addition, each co-processor may be provided with its own memory, which serves only for operations of the co-processor, i.e., a memory 1 814 for co-processor 1, a memory 2 816 for co-processor 2 as well as a memory 3 818 for co-processor 3.

Furthermore, each chip arranged on the computer circuit board 800 depicted in FIG. 7 is supplied, via its own current and/or voltage supply terminal $I_1$ to $I_8$, with the electrical power required for the electronic components within the individual elements to function. Alternatively, only one power supply may exist for the circuit board, which power supply is then distributed to the individual chips on the circuit board across the circuit board. In this case, however, the supply lines leading to the individual chips are available to an attacker.

The concept for typical computer applications depicted in FIG. 7 is unsuitable for cryptography processors, for several reasons. On the one hand, all elements for short-integer arithmetic are listed, whereas cryptography processors must carry out long-integer arithmetic operations.

In addition, each chip on the computer circuit board 800 has its own current and/or power access, which can readily be accessed by an attacker, so as to tap off power profiles or current profiles as a function of time. Tapping off power profiles as a function of time is the basis for a multitude of efficient attacks on cryptography processors. Further background details and/or a more detailed description of various attacks on cryptography processors are given in "Information Leakage Attacks Against Smart Card Implementations of Cryptographic Algorithms and Countermeasures", Hess et al., Eurosmart Security Conference, 13 to 15 Jun., 2000. As countermeasures, implementations have been proposed which are based on the fact that different operations always require the same amount of time, so that an attacker cannot determine from a power profile whether the crypto processor has executed a multiplication, an addition or something else.

"Design of Long Integer Arithmetical units for Public-Key Algorithms", Hess, et al., Eurosmart Security Conference, 13 to 15 Jun., 2000, describes in detail different calculating operations which must be executable by cryptography processors. In particular, modular multiplication, methods for modular reduction as well as the so-called ZDN method, which is set out in the German Patent DE 36 31 992 C2, are described.

The ZDN method is based on a serial/parallel architecture using look-ahead algorithms, which are executable in parallel, for multiplication and modular reduction, so as to transform multiplication of two binary numbers to an iterative 3-operands addition using look-ahead parameters for multiplication and modular reduction. To this end, modular multiplication is broken down into a serial calculation of partial products. At the outset of the iteration, two partial products are formed and, thereafter, added together while considering modular reduction, so as to obtain an intermediate result. Thereafter, a further partial product is formed and, again, added to the intermediate result while considering modular reduction. This iteration is continued until all digits of the multiplier have been processed. For the three-operands addition, a crypto co-processor includes an adding unit which carries out, in a current iteration step, the summation of a new partial product to the intermediate result of the preceding iteration step.

Thus, each co-processor of FIG. 7 could be provided with its own ZDN unit, so as to execute several modular multiplications in parallel, so as to increase throughput for particular applications. However, this solution would be unsuccessful due to the fact that an attacker might be able to determine the current profile of each individual chip, so that an increase in throughput has, indeed, been achieved, however, at the expense of the security of the cryptography computer.

The technical publication "A Design for Modular Exponentiation Coprocessor In Mobile Telecommunication Terminals" Kato T Et al., Cryptographic Hardware And Embedded Systems, $2^{ND}$ International Workshop, 17., 18. Aug. 2000, Proceedings, Lecture Notes in Computer Science, pages 215-228) shows a design for a co-processor for carrying out the modular exponentiation in mobile telecommunication terminals. For carrying out the modular exponentiation, the so-called square-and-multiply algorithm is used. A Left-to-Right circuit (LRC) and Right-to-Left circuit (RLC) will be examined. In particular, it is proposed to select a unit for modular squaring and a unit for modular multiplication by a common control unit. Moreover, a further modular multiplication circuit in addition to a further modular squaring circuit is provided, which are also connected by a common control. Alternatively, it is proposed to control three modular multiplication units by a common control. The three modular multiplication units operate in parallel, with two multiplication units performing a right-to-left calculation, while the third multiplication unit performs a dummy calculation. Alternatively, two multiplication units perform a left-to-right calculation, while the third multiplication unit performs a dummy calculation. Again, alternatively, a special algorithm is performed by two multiplication units, while the third multiplication unit performs a dummy calculation.

The technical publication "High-Speed RSA Hardware Based On Barret's Modular Reduction Method", J. Groβ-schaedl, $2^{ND}$ International Workshop, Ches 2000, Proceedings, Lecture Notes In Computer Science, Vol. 1965, 17 Aug. 2000, pages 191-203, discloses an RSA crypto-chip with an interface/control unit, a multiplier core, and an E/O register with 1056 bits. The multiplier core is a sub-parallel multiplier with diverse registers, a carry-save adder, two carry-lookahead adders in addition to an accumulator and further elements. The interface/control unit provides a 16-bit standard microcontroller interface, via which a data exchange and a command call take place. The control unit controls the multiplier core. The register supports a 16-bit data transfer with the interface unit and a 1056-bit parallel data exchange with the multiplier core.

SUMMARY OF THE INVENTION

It is the object of the present invention to provide a fast and secure cryptography processor.

In accordance with the present invention, this object is achieved by a cryptography processor for carrying out operations for cryptographic applications, comprising the following: a central processing unit for obtaining commands for executing an operation and for outputting results of an operation; a co-processor coupled to the central processing unit, the co-processor comprising the following: a plurality of calculating subunits, each calculating subunit comprising at least one arithmetical unit; and a single control unit coupled to each of the plurality of calculating subunits and arranged to subdivide an operation into sub-operations, to distribute the sub-operations among the plurality of calculating subunits and to control the execution of the operation by the plurality of calculating subunits, wherein the plurality of calculating subunits, the central processing unit, and the control unit are integrated on a single chip, and wherein the single chip comprises a common supply current access for supplying the plurality of calculating subunits, the central processing unit, and the control unit with current.

The present invention is based on the findings that a fast cryptography processor can be achieved only when a cryptography calculating operation is broken down into several sub-operations and when these sub-operations are executed by calculating subunits arranged in parallel. On the other hand, security, in particular with regard to power interception attacks, can only be achieved when all calculating subunits, including the control unit for the calculating subunits and the central processing unit, are arranged on a single chip, so that the power accesses for the individual components are not available to an external attacker.

To put it another way, the central processing device and the co-processor, which has a single control unit as well as the plurality of calculating subunits, are integrated on a single chip. In addition, this single chip exhibits only one single supply access for supplying the plurality of calculating subunits, the control unit and the central processing unit with current.

Integrating these components on a single chip and supplying the chip with a supply current access offers the advantage that the current profiles associated with the operations of the calculating subunits superpose at the cryptography processor's current terminal. If, for example, two calculating subunits work in parallel, the current profiles of these two calculating subunits superpose such that it is difficult for the attacker to determine, by means of the power supply profile, which operations are carried out by the two calculating subunits simultaneously and with which numbers. If the number of calculating subunits is increased, the current profile at the single supply terminal is becoming increasingly homogeneous. Due to increasing parallel processing with an increasing number of parallel calculating subunits, however, throughput also arises, so that, in the inventive concept, security also rises with an increase in throughput. This has not been the case in prior art, on the contrary—security decreased with an increase in throughput.

A limit to parallel processing is achieved when the calculating expenditure in the control unit with regard to dividing sub-operations up among the calculating subunits and with regard to driving the individual calculating subunits sees a strong increase. For operations of a relatively long duration, such as the multiplication of two very long integers, however, the ratio of calculating time in a calculating subunit to the calculating time of the control unit for organisational and administrative tasks is so high that a considerable degree of parallelism can be achieved without the expenditure in terms of administration taking on problematic orders of magnitude.

However, this degree of parallelism is necessary in order to increase throughput sufficiently so that speed losses of the logic units, which occur when logic modules as well as memory modules are integrated on the same chip, can be compensated for. Generally, the intention is to arrange logic modules and memory modules on separate chips, since the technologies for these two modules differ. In other words, memory technology with which logic modules are produced does not allow logic modules which are as fast as in the case where logic modules are produced with a technology adapted specifically for logic modules. Therefore, in the example of the simple parallel connection of different co-processors, shown in FIG. 7, memories and calculating units are always implemented on separate modules.

However, it is the very fact that an attacker is unable to intercept communication between a calculating unit and a register that is important for high security.

BRIEF DESCRIPTION OF THE DRAWINGS

Preferred embodiments of the present invention will be explained in detail below with reference to the accompanying drawings, in which:

FIG. 5 shows an example for dividing a modular exponentiation into a number of modular multiplications;

FIG. 6 shows a further example for dividing up a modular multiplication among different calculating subunits.

DESCRIPTION OF THE PREFERRED EMBODIMENTS

Figure 1:
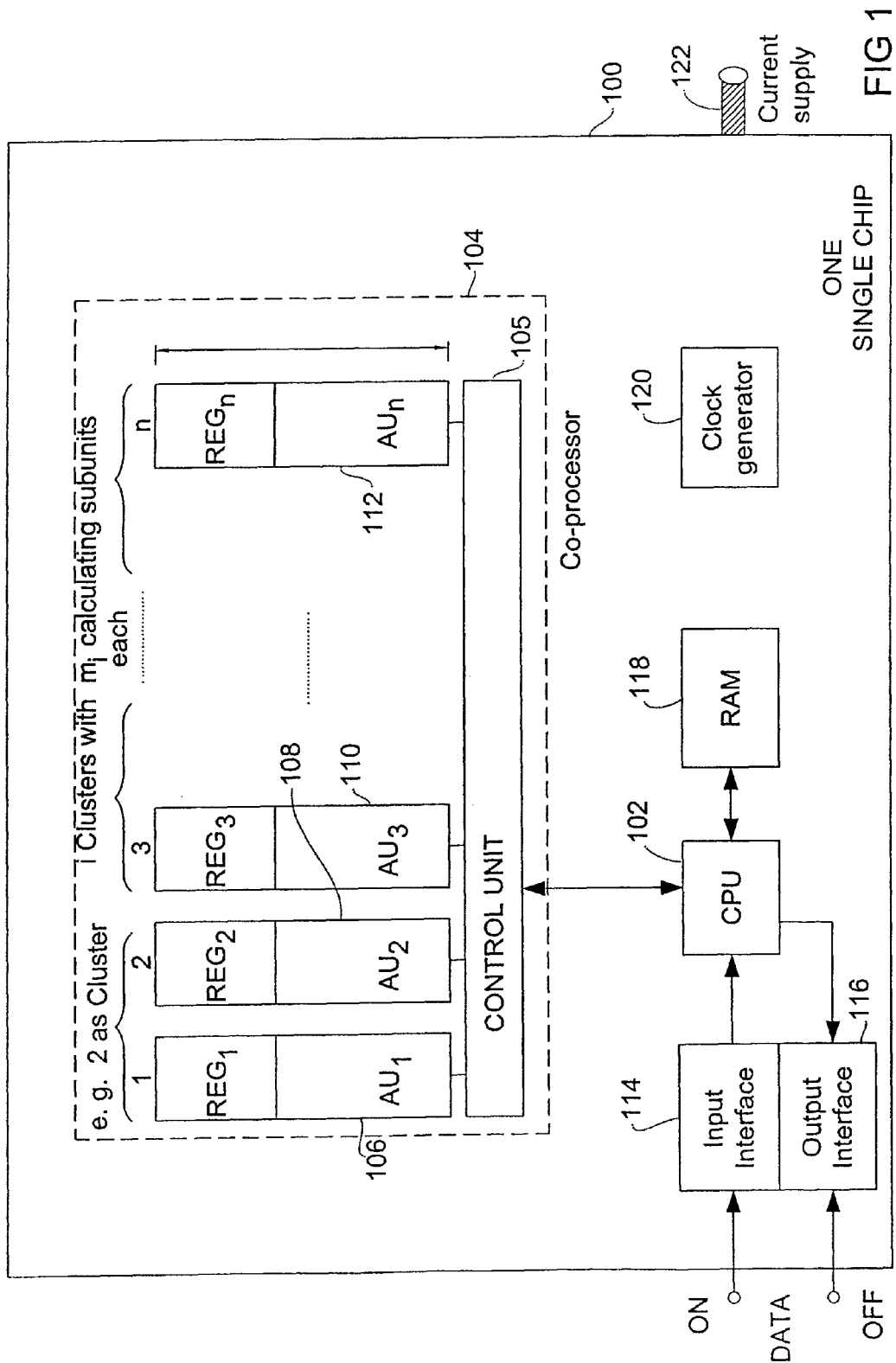
FIG. 1 shows an inventive crypto processor integrated on a single chip.

Before the individual figures will be described in more detail, it will be detailed below as to why higher security can be achieved by connecting in parallel several calculating subunits arranged on a chip and driven by a control unit which is arranged on the same chip.

Crypto processors are used for applications which are critical in terms of security, for example for digital signatures, authentications or encryption tasks. For example, an attacker wants to find out the secret key so as to crack the cryptography method. Cryptography processors are used in chip cards, for example, which, as has already been discussed, include smart cards or signature cards for a legally binding electronic signature or also for home banking or for paying by mobile phone, etc. Alternatively, such crypto processors are also used in computers and servers as security ICs, so as to carry out an authentication or to be able to perform encryption tasks which may, for instance, consist in paying safely via the Internet, in so-called SSL sessions (SSL=Secure Socket Layer), i.e., in transmitting credit card numbers safely.

Typical physical attacks measure current consumption (SPA, DPA, timing attacks) or electromagnetic emission. As far as a further explanation of the attacks is concerned, reference shall be made to the pieces of literature mentioned at the outset.

As today's semiconductor technology, which achieves structures in the range of typically 250 nanometers or less, makes it very hard for attackers to carry out local current measurements, it is typically the current consumption of the entire chip card, including CPU and the co-processor, which is composed of the sum of the individual current consumptions of, say, the CPU, the RAM, a ROM, an $E^2PROM$, a flash memory, a time control unit, a random number generator (RNG), a DES module and the crypto co-processor, that is measured in an attack.

Since the crypto co-processor typically exhibits the highest current consumption, an attacker can see when the crypto co-processor starts calculating. To avoid this, the aim would be for current consumption to be completely constant over time; an attacker would then no longer find out when the crypto co-processors starts calculating. Even though this ideal goal cannot be reached, the aim is to achieve "noise" which is as uniform as possible and is centered around a mean value by connecting calculating subunits in parallel in accordance with the invention.

The current consumption of a chip produced, for example, in CMOS technology, changes from "0" to "1" in a switchover. Therefore, current consumption is dependent on data and on the commands used by the CPU and the crypto co-processor.

If several calculating subunits are connected in parallel and if one has them process several operations or sub-operations in parallel, or if an operation is distributed among several calculating subunits, the current profiles resulting from data and command processing will superpose, as has been discussed.

The more calculating subunits are working in parallel, the more difficult it is to infer data and commands in the individual calculating subunits and/or in the control unit, since the data and commands in each calculating subunit will typically be different, the attacker, however, will only see the superposition of different commands.

FIG. 1 shows an inventive crypto processor for carrying out operations for cryptographic applications. The crypto processor is implemented on a single chip 100 and includes a central processing unit (CPU) 102 and a co-processor 104. The co-processor 104 is arranged, as is shown in FIG. 1, on the same chip as is the central processing unit 102. The co-processor includes a plurality of calculating subunits 106, 108, 110 and 112, with each calculating subunit 106 to 112 comprising its own arithmetical unit AU. Preferably, each calculating subunit 106 to 112 includes, in addition to the AU, also at least one register (REG) so as to be able to store intermediate results, as will be explained with reference to FIG. 2.

A typical crypto processor will include an input interface 114 and an output interface 116, which are connected with external terminals for data input or data output, respectively, as well as with CPU 102. Typically, CPU 102 has associated with it its own memory 118, which is designated by RAM in FIG. 1. Among others, the crypto processor can also include a clock generator 120, further memories, random number generators, etc., which are not shown in FIG. 1.

It should be pointed out that all elements represented in FIG. 1 are implemented on a single chip which is supplied with power by a single current supply terminal 122. Chip 100 internally includes current supply lines leading to all elements shown in FIG. 1, which, however, cannot be intercepted individually for the reasons indicated above. In contrast, it is very easy to intercept the current supply terminal 122. Unlike the circuit board shown in FIG. 7, wherein the current supply terminals of each individual component can be very readily intercepted and, therefore, have very "expressive" current profiles, the current profile present at the current supply terminal 122 is nearly constant and/or exhibits a noise around a constant value which is as homogeneous as possible. This can be attributed to the fact that the co-processor 104, which contributes the most to the current consumption, exhibits a plurality of calculating subunits arranged in parallel which, for example, switch from "0" to "1" independently of one another and, therefore, consume current uncorrelatedly to one another.

The parallel connection of the individual calculating subunits leads to the fact that the throughput of the crypto processor can be increased, so that, in the case of the implementation of a memory on the chip, the accompanying speed losses which occur due to different technologies being used for the memory and the calculating units can be more than compensated for.

In accordance with a preferred embodiment of the present invention, two or more calculating subunits can be combined to form so-called clusters, such that, for example, a first cluster carries out sub-operations of a first operation, whereas a second cluster carries out sub-operations of a second cryptographic operation. Thus, for example, the first cluster, which consists of calculating subunits 106 and 108, might carry out two modular exponentiations at half the length in each case, which are derived from a single modular exponentiation at full length, whereas the second cluster, which consists of calculating subunits 110 and 112, might carry out a modular multiplication as is shown in FIG. 6.

Alternatively, a cluster might carry out an RSA operation, whereas another cluster carries out a DES operation, and yet another cluster calculates, say, a hash sum.

It should be explained at this point that the cryptography algorithms mentioned are known in literature and are, therefore, not explained in any more detail. It should also be pointed out merely by way of example that, for example, in an RSA encryption operands with a length of 2048 bits are processed. In decryption, it is possible, by means of the Chinese Remainder Theorem (CRT), to work with operands of half the length and two sub-operations. If a cryptography processor is designed merely for such an algorithm, the number of calculating subunits is 2, and the length of the arithmetical units would merely be 1024 instead of 2048 for a single arithmetical unit. The sub-operations in accordance with the Chinese Remainder Theorem are processed in parallel and then, controlled by the control unit, combined in one of the two calculating subunits, so as to obtain the result.

Figure 2:
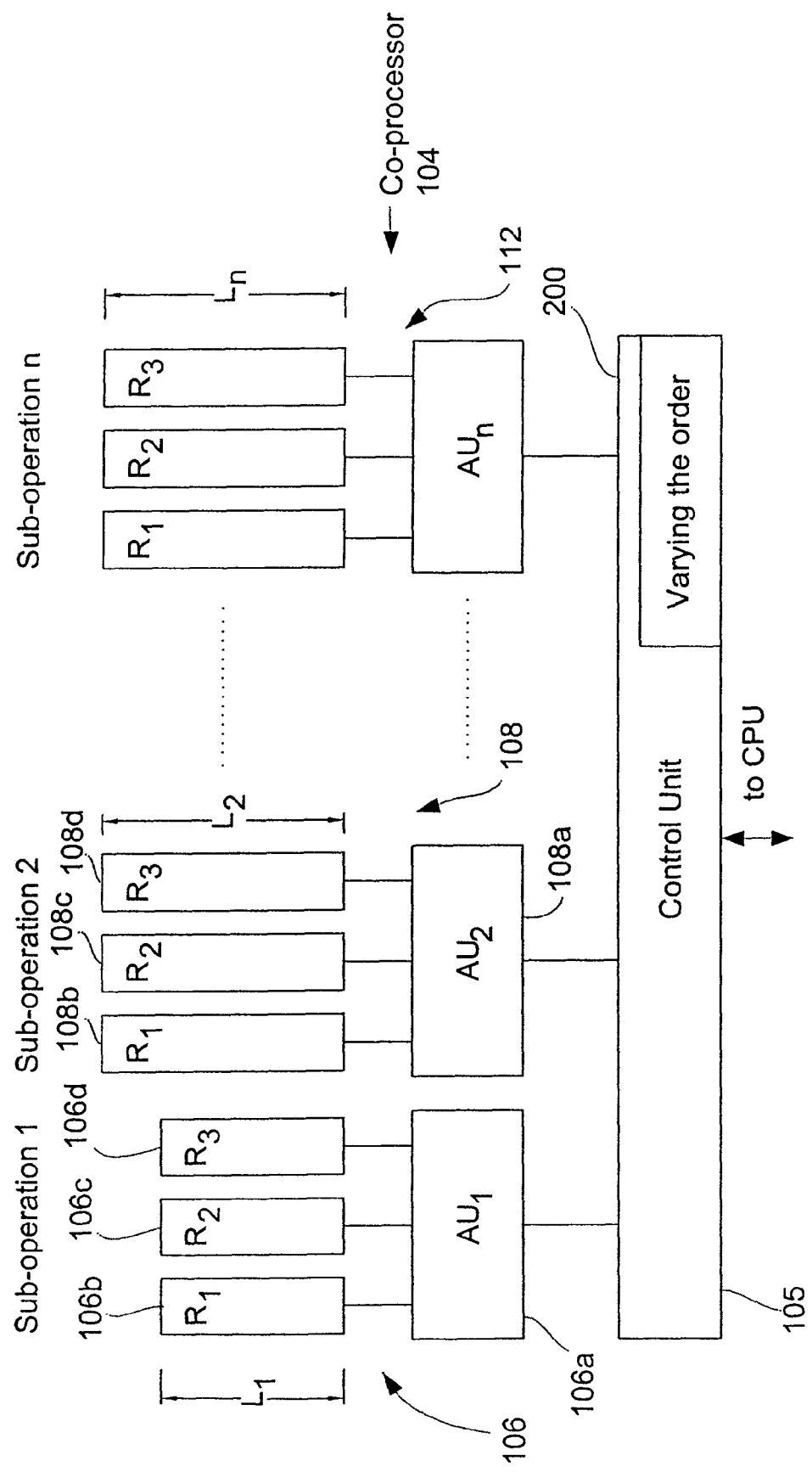
FIG. 2 shows a more detailed representation of the co-processor exhibiting different calculating subunits with registers of different lengths.

FIG. 2 shows a more detailed representation of the co-processor 104 depicted in FIG. 1. In addition to the arithmetical unit 106a, the calculating subunit 106 includes, for example, three registers 106b, 106c, 106d. By analogy therewith, the calculating subunit 108 includes the arithmetical unit 108a as well as, for example, also three registers 108b, 108c, 108d. The same goes for calculating subunit 112. As is shown in FIG. 2, the length of the registers of a calculating subunit may differ from the length of the register of a different calculating subunit, so that operations with numbers of a length of $L_1$ can be carried out with calculating subunit 106, for example, whereas operations with numbers of a length of $L_2$ can be carried out with calculating subunit 102.

For example, the control unit 105 can further drive the two calculating subunits 106 and 102 such that the arithmetical units $AU_1$ and $AU_2$ are coupled to each other in such a manner that both calculating subunits, which will then form a cluster, will carry out arithmetical operations with numbers of a length of $L_1+L_2$. Therefore, the registers of both calculating subunits can be interconnected.

Alternatively, a calculating subunit may be exclusively assigned a number of registers which is large enough for the operands to suffice for several sub-operations, such as modular multiplications or modular exponentiations. In order to avoid information leaks, the sub-operations may then be superposed or even randomly mixed, for example, by a means for varying the order of the same, which is designated by 200 in FIG. 2, in order to achieve further concealment of the current profile. This will be particularly advantageous when, say, merely two calculating subunits are present and/or when merely two calculating subunits are working while the other calculating subunits of a cryptography processor are currently idling.

In a preferred cryptography processor, the number of registers associated with a calculating subunit is sufficient so as to hold operands for at least two sub-operations, and the processor is adapted to not transfer any operands between the co-processor and the central processing unit for the at least two sub-operations.

In accordance with a preferred embodiment of the present invention, the control unit 105 further includes a means, not shown in FIG. 2, for switching off calculating subunits and/or registers of calculating subunits when these are not required, which may be an advantage, in particular, for battery-driven applications, so as to save in terms of current consumption of the overall circuit. Even though CMOS modules require a significant amount of current only when a switch-over is being effected, they also exhibit closed-circuit current consumption, which may become relevant when the power available is limited.

Figure 4A:
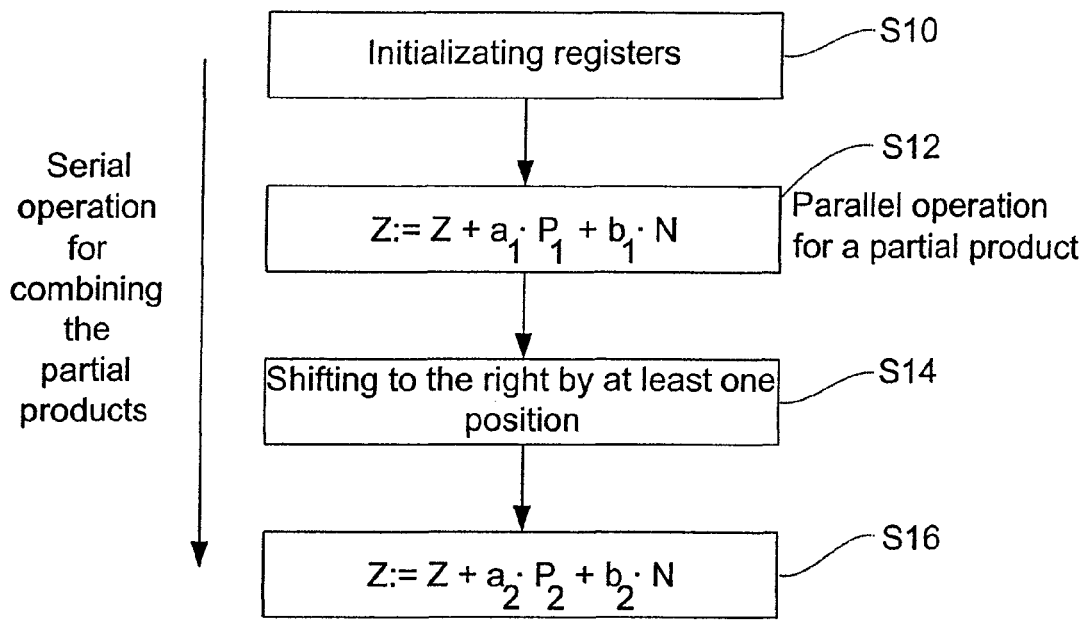
FIG. 4a shows a schematic flow chart for carrying out modular multiplication in a serial/parallel manner.
Figure 4B:
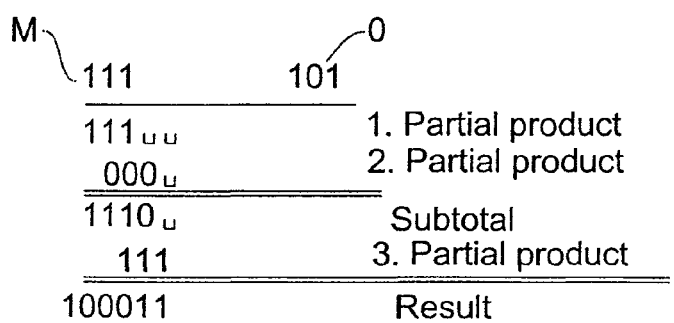
FIG. 4b shows a numerical example for illustrating the serial/parallel mode of operation of a calculating unit using the example of a multiplication.

As has already been explained, a crypto processor exhibits the characteristic, due to the long numbers that it must process, that certain sub-operations, such as a serial/parallel multiplication, as are shown with reference to FIGS. 4a and 4b, require a relatively large amount of time. Preferably, the calculating subunits are implemented such that they can carry out such a sub-operation independently without any interventions on the part of the control unit 105 after the control unit has supplied the necessary command to the calculating unit. To do this, every calculating subunit naturally requires registers for storing the intermediate solutions.

Due to the fact that a calculating subunit works for a relatively long time without any input of the control unit 105, the control unit 105 may provide a plurality of individual calculating subunits with the necessary commands in a serial manner, as it were, i.e., one after the other, such that all calculating subunits work in parallel, however in a staggered manner, as it were, with regard to one another.

As an example, the first calculating subunit is activated at a certain point in time. Once the control unit 105 has finished activating the first calculating subunit, it immediately activates the second calculating unit, while the first calculating unit is already working. The third calculating subunit will be activated once the activation of the second calculating subunit is completed. This means that during the activation of the third calculating subunit, the first and second calculating subunits are already calculating. If this is carried out for all n calculating subunits, all calculating subunits are working in a manner staggered in time. If all calculating subunits are working in such a manner that their sub-operations take an equal amount of time, the first calculating subunit will be the first to finish. Now, the control unit may transmit the results from the first calculating subunit to the central processing unit and ideally has finished this transmission before the second calculating subunit has finished. Thus, the throughput can be increased considerably, an optimum utilization of the calculating capacity of the control unit 105 being achieved as well. If all calculating subunits execute identical operations, a strongly concealed current profile will, nevertheless, result, since all calculating subunits work in a manner staggered in time. The case would be different if all calculating subunits were activated by the control unit at the same point in time and worked, in a sense, completely synchronously. Then, a non-concealed current profile and even an enhanced current profile would result. Therefore, serially activating the calculating subunits is advantageous also with regard to the security of the cryptography processor.

Figure 3:
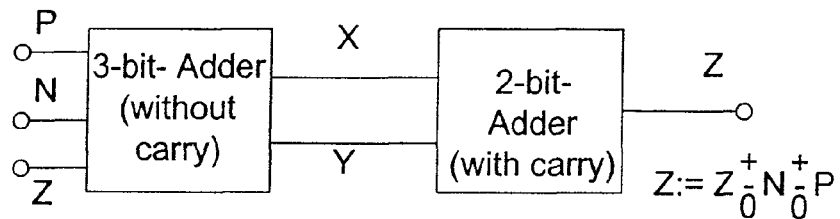
FIG. 3 shows a more detailed representation of a calculating unit suited for a three-operands addition.

In the following, FIG. 3 shall be dealt with, which represents an apparatus for carrying out a three-operands addition, as is indicated by means of a formula on the right-hand side in FIG. 3. The formula on the right-hand side in FIG. 3 shows that an addition and a subtraction are equally executed, since an operand must simply be multiplied by the factor "−1" to obtain a subtraction. The three-operands addition is carried out by means of a three-bit adder working without a carry, i.e., a half adder, and a downstream two-bit adder working with a carry, i.e., which is a full adder. Alternatively, a case may also occur where only the operand N, only the operand P or no operand at all is to be added to and/or to be subtracted from the operand Z. In FIG. 3, this is symbolised by the "zero" under the plus/minus sign and is symbolised by the so-called look-ahead parameters $a_1$, $b_1$, shown in FIG. 4a, which are calculated anew in each iteration step.

FIG. 3 shows a so-called bit-slice of such an adding unit. For the addition of three numbers with, for example, 1024 binary positions, the arrangement shown in FIG. 3 would be present 1024 times in the arithmetical unit of a calculating unit 106 for a fully parallel operation.

In a preferred embodiment of the present invention, each calculating subunit 106 to 112 (FIG. 1) is arranged to execute a modular multiplication using the look-ahead algorithm set out in DE 36 31 992 C2.

A modular multiplication required to do this is explained with reference to FIG. 4b. The task is to multiply the binary numbers "111" and "101". To this end, this multiplication is executed, in a calculating subunit, by analogy with a multiplication of two numbers in accordance with well-known "orthodox mathematics", however, with a binary number representation. In the following, the case where no look-ahead algorithm and no modulo reduction is employed will be considered on the grounds of the simplicity of the representation. When this algorithm is carried out, a first partial product "111" will initially result. This partial product will then be shifted by one position to the left, so as to consider its significance. In a second iteration step, the second partial product "000" will be added to the first partial product which has been shifted to the left and may be considered an intermediate result of a first iteration step. The result of this addition will thereafter be again shifted to the left by one position. The shifted result of this addition is then the updated intermediate result. The last partial product "111" is then added to this updated intermediate result. The result obtained will be the final result of the multiplication. It can be seen that the multiplication has been divided up into two additions and two shifting operations.

It can further be seen that the multiplicand M represents the partial product when the position of the multiplier considered is a binary "1". However, the partial product is 0 when the position of the multiplier considered is a binary "0". Further, the position and/or valencies (significancies) of the partial products are considered through the respective shifting operations. In FIG. 4b, this is shown by the staggered plotting of the partial products. In terms of hardware, two registers $Z_1$ and $Z_2$ are required for the addition of FIG. 4b. The first partial product may be stored in register $Z_1$ and thereafter be shifted to the left by one bit in this register. The second partial product may be stored in register $Z_2$. The intermediate sum may then again be stored in register $Z_1$ and thereafter again be shifted to the left by one bit. The third partial product would again be stored in register $Z_2$. The final result would then be found in register $Z_1$.

A schematic flow chart for the method shown in FIG. 4b can be found in FIG. 4a. Initially, the registers present in a calculating subunit are initialised in a step S10. Subsequently, after initialising, a three-operands addition is carried out in a step S12 to calculate the first partial product. It shall be pointed out that for the simple example given in FIG. 4b, which represents a multiplication without a modulo operation, the equation designated in FIG. S12 would include only Z, $a_1$ and $P_1$. $a_1$ may be referred to as a first look-ahead parameter. In the very simplest implementation, a has a value of "1" when the position of the multiplier O considered is 1. a is equal to zero when the position of the multiplier considered is zero.

The operation shown in block S12 is carried out in parallel for all, say, 1024 bits. Thereafter, a shifting operation to the right by one position is carried out in the simplest case in a step S14 to take into account that the most significant bit of the second partial product is arranged lower, by one position, than the most significant bit of the first partial product. If several subsequent bits of the multiplier O exhibit a zero, a shift to the right by several positions will take place. Finally, the parallel three-operands addition is carried out again in a step S16, for example using the adder chain shown in FIG. 3.

This procedure is continued until all, say, 1024 partial products have been summed up. Serial/parallel also means parallel execution in block S12 or S16 and serial processing so as to combine all partial products with each other in succession.

Figure 7:
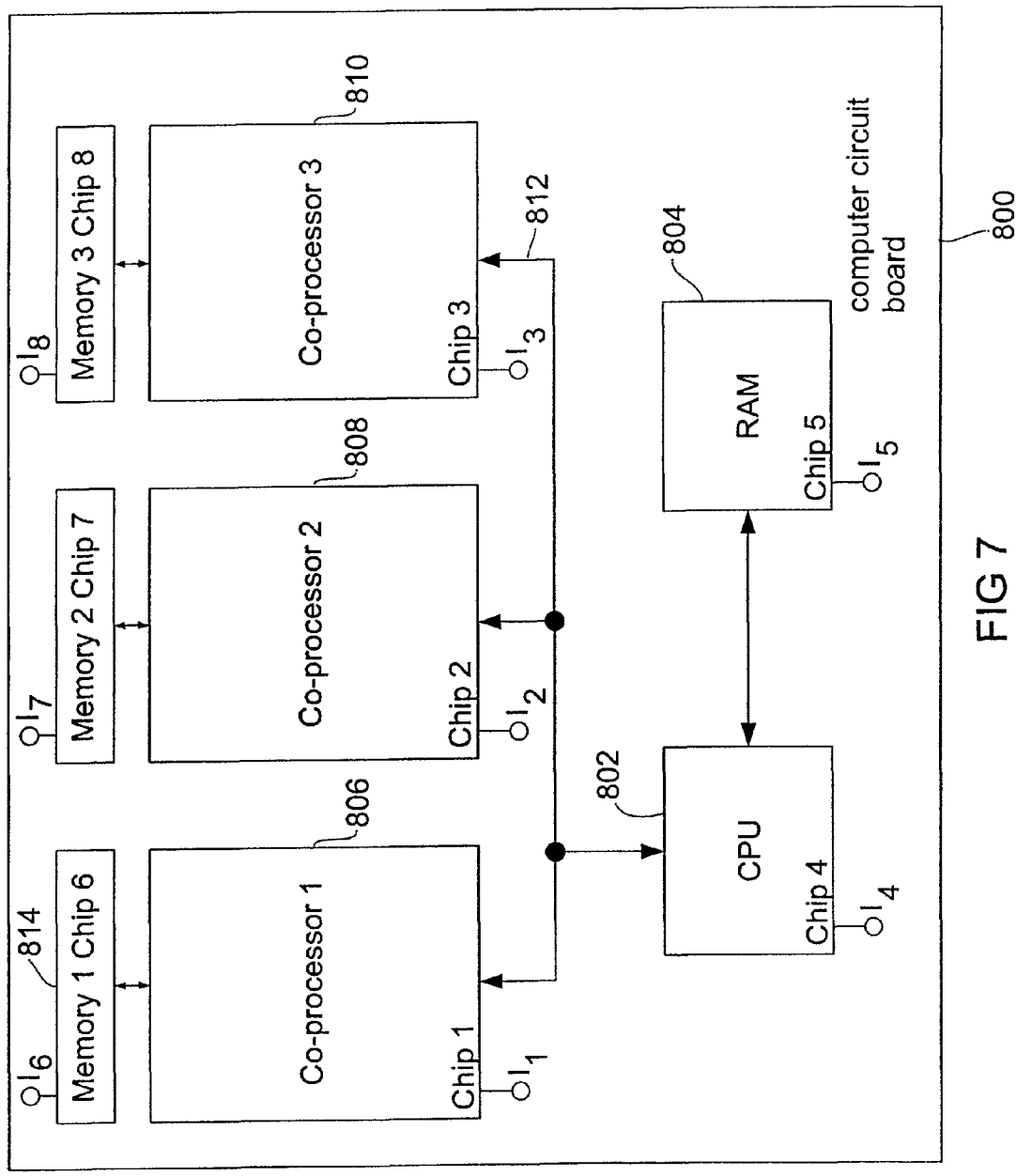
FIG. 7 shows a computer circuit board with a plurality of separately supplied modules.

In the following, reference is made to FIGS. 5 to 7 in order to provide several examples of how an operation may be divided up into certain sub-operations. The operation $x^d$ mod N in FIG. 5 shall be considered. For breaking down this modular exponentiation, the exponent d is shown in binary notation. As is shown in FIG. 5, this results in a chain of modular multiplication, wherein, as is also shown in FIG. 5, each individual modular operation can be assigned to one calculating subunit, respectively, such that all modular operations are executed in parallel by the cryptography processor shown in FIG. 1. The intermediate results then obtained are multiplied, after they have been determined in parallel, so as to obtain the result. In this process, control unit 105 controls the division among the individual calculating subunits $TRW_1$ to $TRW_k$ and thereafter the final multiplying of the individual intermediate results.

A further example of a division of an operation (a*b) mod c into several modular operations is shown in FIG. 6. Again, calculating subunit $TRW_1$ may determine a first intermediate result. Calculating subunits $TRW_2$ to $TRW_n$ also calculate intermediate results, whereupon, after the intermediate results have been obtained, control unit 105 controls multiplication of the intermediate results. For example, the control unit controls the adding-up in such a manner that it selects a calculating subunit which will then receive the intermediate results for summing up. This means that here, too, an operation is divided up into several sub-operations independent of one other.

It shall be pointed out that there are many possibilities of dividing up one or the other operation into sub-operations. The examples given in FIGS. 5 and 6 merely serve to illustrate the possibilities of dividing an operation up into a plurality of sub-operations, it being possible that more expedient divisions with regard to achievable performance may exist. What is essential about the examples is therefore not the performance of the processor, but the fact that divisions exist, so that each calculating subunit carries out an independent sub-operation, and the fact that a plurality of sub-operations is controlled by a control unit so as to obtain, at the current input into the chip, a current profile which is concealed as much as possible.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Cryptography processor for carrying out operations for cryptographic applications, comprising:
   a central processing unit for obtaining commands for executing an operation and for outputting results of an operation;
   a co-processor coupled to the central processing unit, the co-processor comprising:
   a plurality of calculating subunits, each calculating subunit comprising at least one arithmetical unit, wherein each calculating subunit further comprises a plurality of registers exclusively assigned to the arithmetical unit of the respective calculating subunit, and wherein each calculating subunit comprises a word length specified by the number width of the arithmetical unit; and
   a single control unit coupled to each of the plurality of calculating subunits and arranged to sub-divide an operation into sub-operations, to distribute the sub-operations among the plurality of calculating subunits and to control the execution of the operation by the plurality of calculating subunits, wherein the single control unit is arranged to interconnect at least two calculating subunits in such a manner that the interconnected calculating subunits are adapted to perform a calculation with numbers whose word length is equal to the sum of the number widths of the interconnected calculating subunits,
   the calculating subunits being implemented for carrying out the suboperations independently without any intervention on the part of the control unit, after the control unit has supplied the necessary command to the calculating unit;
   wherein the plurality of calculating subunits, the central processing unit, and the single control unit are integrated on a single chip; and
   wherein the single chip comprises a common supply current access for supplying the plurality of calculating subunits, the central processing unit, and the single control unit with current.

2. Cryptography processor as claimed in claim 1, wherein the operations for cryptographic applications include a modular exponentiation and/or a modular multiplication.

3. Cryptography processor as claimed in claim 1, wherein each calculating subunit is arranged to process binary numbers with at least 512 digits and preferably at least 1024 or 2048 digits.

4. Cryptography processor as claimed in claim 1, which further comprises a memory associated only with the central processing unit.

5. Cryptography processor as claimed in claim 1, comprising:
   a clock generation device for delivering a clock to the central processing unit, to the plurality of calculating subunits and to the single control unit, the clock generation device also being integrated on the single chip.

6. Cryptography processor as claimed in claim 1,
   wherein the length of the plurality of registers assigned to a calculating subunit, and the length of the plurality of registers associated with another calculating subunit differ, such that the calculating subunits are adapted to carry out arithmetical calculations with numbers of differing lengths.

7. Cryptography processor as claimed in claim 1, wherein the number of registers associated with a calculating subunit is sufficient so as to hold operands for at least two sub-operations, wherein the processor is adapted to not transfer any operands between the co-processor and the central processing unit for the at least two sub-operations.

8. Cryptography processor as claimed in claim 7, wherein the single control unit further comprises:
   a device for controlling, in terms of time, the operation of the calculating subunits, such that the order of the at least two sub-operations, the operands of which are stored in the registers of a calculating subunit, is adjustable.

9. Cryptography processor as claimed in claim 1, further comprising:
   a device for switching off a selected calculating subunit if it is determined by the single control unit that there do not exist any sub-operations for the selected calculating subunit, so as to reduce the current consumption of the cryptography processor.

10. Cryptography processor as claimed in claim 1, wherein the single control unit is arranged to combine at least two calculating subunits into a cluster, such that a sub-operation is assigned to the cluster, so that this sub-operation is executable jointly by the calculating subunits of the cluster.

11. Cryptography processor as claimed in claim 1, wherein the arithmetical unit of at least one calculating subunit comprises a serial/parallel calculating unit implemented such that a number of calculations are executable in parallel in one cycle, the number being equal to the digits of a number used in the calculation, and the same calculation as in the one cycle being performed in a different, later cycle in a serial manner using the result of the one cycle.

12. Cryptography processor as claimed in claim 11, wherein one calculating subunit is implemented for a modular multiplication so as to add, in the one cycle, a partial product to one result of a previous cycle, and so as to add, in a further cycle, the result of the latest cycle to a next partial product.

13. Cryptography processor as claimed in claim 12, wherein the arithmetical unit comprises a three-operands adder for a modular multiplication, which three-operands adder comprises, for each digit of a processed number:
   a half adder for an addition without carry with three inputs and two outputs; and
   a downstream full adder with two inputs and one output.

14. Cryptography processor for carrying out operations for cryptographic applications, comprising:
   a central processing unit for obtaining commands for executing an operation and for outputting results of an operation;
   a co-processor coupled to the central processing unit, the co-processor comprising:
   a plurality of calculating subunits, each calculating subunit comprising at least one arithmetical unit, wherein each calculating subunit further comprises a plurality of registers exclusively assigned to the arithmetical unit of the respective calculating subunit, wherein the length of the plurality of registers associated with a first calculating subunit, and the length of the plurality of registers associated with a second calculating subunit differ from each other, and wherein the first and second calculating subunits are adapted to carry out arithmetical calculations with numbers of differing lengths corresponding to the differing lengths of the plurality of registers; and
   a single control unit coupled to each of the plurality of calculating subunits and arranged to sub-divide an operation into sub-operations, to distribute the sub-operations among the plurality of calculating subunits and to control the execution of the operation by the plurality of calculating subunits, said calculating subunits being implemented for carrying out the suboperations independently without any intervention on the part of the control unit, after the control unit has supplied the necessary command to the calculating unit;

wherein the plurality of calculating subunits, the central processing unit, and the single control unit are integrated on a single chip, and wherein the single chip comprises a common supply current access for supplying the plurality of calculating subunits, the central processing unit, and the single control unit with current.

15. Cryptography processor for carrying out operations for cryptographic applications, comprising:

a central processing unit for obtaining commands for executing an operation and for outputting results of an operation;

a co-processor coupled to the central processing unit, the co-processor comprising:

a plurality of calculating subunits, each calculating subunit comprising at least one arithmetical unit, wherein each calculating subunit further comprises a plurality of registers exclusively assigned to the arithmetical unit of the respective calculating subunit, wherein the number of registers associated with a calculating subunit is sufficient so as to hold operands for at least two sub-operations; and a single control unit coupled to each of the plurality of calculating subunits and arranged to sub-divide an operation into sub-operations, to distribute the sub-operations among the plurality of calculating subunits and to control the execution of the operation by the plurality of calculating subunits, wherein the cryptography processor is adapted to not transfer any operands between the co-processor and the central processing unit for the at least two sub-operations, and wherein the single control unit includes a device for controlling, in terms of time, the operation of the calculating subunits, such that the order of the at least two sub-operations, the operands of which are stored in the registers of a calculating subunit, is adjustable;

said calculating subunits being implemented for carrying out the suboperations independently without any intervention on the part of the control unit, after the control unit has supplied the necessary command to the calculating unit;

wherein the plurality of calculating subunits, the central processing unit, and the single control unit are integrated on a single chip, and wherein the single chip comprises a common supply current access for supplying the plurality of calculating subunits, the central processing unit, and the single control unit with current.

16. Cryptography processor for carrying out operations for cryptographic applications, comprising:

a central processing unit for obtaining commands for executing an operation and for outputting results of an operation;

a co-processor coupled to the central processing unit, the co-processor comprising:

a plurality of calculating subunits, each calculating subunit comprising at least one arithmetical unit; and a single control unit coupled to each of the plurality of calculating subunits and arranged to sub-divide an operation into sub-operations, to distribute the sub-operations among the plurality of calculating subunits and to control the execution of the operation by the plurality of calculating subunits; and a device for switching off a selected calculating subunit or registers of a selected calculating subunit when it is determined by the single control unit that there do not exist any operations for the selected calculating subunit, so as to reduce the current consumption of the cryptography processor;

said calculating subunits being implemented for carrying out the suboperations independently without any intervention on the part of the control unit, after the control unit has supplied the necessary command to the calculating unit;

wherein the plurality of calculating subunits, the central processing unit, and the single control unit are integrated on a single chip, and wherein the single chip comprises a common supply current access for supplying the plurality of calculating subunits, the central processing unit, and the single control unit with current.

* * * * *